(12) United States Patent
Parchami et al.

(10) Patent No.: US 11,460,851 B2
(45) Date of Patent: Oct. 4, 2022

(54) ECCENTRICITY IMAGE FUSION

(71) Applicant: Ford Global Technologies, LLC, Dearborn, MI (US)

(72) Inventors: Mostafa Parchami, Dearborn, MI (US); Chandana Neerukonda, Detroit, MI (US); Gintaras Vincent Puskorius, Novi, MI (US); Enrique Corona, Canton, MI (US); Kunjan Singh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 728 days.

(21) Appl. No.: 16/421,563

(22) Filed: May 24, 2019

(65) Prior Publication Data

US 2020/0371524 A1 Nov. 26, 2020

(51) Int. Cl.
*G05D 1/02* (2020.01)
*G06K 9/62* (2022.01)
(Continued)

(52) U.S. Cl.
CPC ......... *G05D 1/0221* (2013.01); *G06K 9/6288* (2013.01); *G06N 3/0454* (2013.01);
(Continued)

(58) Field of Classification Search
CPC ......... G05D 1/0221; G05D 2201/0213; G06K 9/6288; G06N 3/0454; G06N 3/084;
(Continued)

(56) References Cited

U.S. PATENT DOCUMENTS 5,706,417 A   1/1998 Adelson
5,787,199 A   7/1998 Lee
(Continued)

FOREIGN PATENT DOCUMENTS

CN   102201121 A   9/2011
CN   101582160 B   9/2013
(Continued)

OTHER PUBLICATIONS

Wang, et al., "An Optimization Clustering Algorithm Based on Texture Feature Fusion for Color Image Segmentation", Algorithms, Jun. 2015, retrieved from Internet URL: https://www.researchgate.net/publication/277019137, pp. 234-247 (15 pages).
(Continued)

*Primary Examiner* — Charles T Shedrick
(74) *Attorney, Agent, or Firm* — Frank A. MacKenzie; Bejin Bieneman PLC

(57) ABSTRACT

A system, comprising a computer that includes a processor and a memory, the memory storing instructions executable by the processor to input a red-green-blue (RGB) image and an eccentricity image to a neural network which outputs a located object based on combining the RGB image and the eccentricity image, wherein the eccentricity image is based on a per-pixel rolling average and a per-pixel rolling variance over a moving window of k video frames. The memory can further include instructions executable by the processor to receive the located object at a computing device included in one or more of a vehicle or a traffic information system.

20 Claims, 10 Drawing Sheets

(51) Int. Cl.
  *G06N 3/04* (2006.01)
  *G06V 20/10* (2022.01)
  *G06V 20/56* (2022.01)
(52) U.S. Cl.
  CPC .............. *G06V 20/10* (2022.01); *G06V 20/56* (2022.01); *G05D 2201/0213* (2013.01)
(58) Field of Classification Search
  CPC ........ G06V 20/10; G06V 20/56; G06V 20/54; G06V 20/58; G06T 5/50; G06T 2207/20221; G06T 2207/30248; B60W 50/00; B60W 2050/0002; B60W 7/20084
  See application file for complete search history.

(56) References Cited

U.S. PATENT DOCUMENTS

| | | | |
|---|---|---|---|
| 6,580,812 | B1 | 6/2003 | Harrington |
| 6,956,469 | B2 | 10/2005 | Hirvonen et al. |
| 7,149,328 | B2 | 12/2006 | Kamijo et al. |
| 7,418,113 | B2 | 8/2008 | Porikli et al. |
| 7,710,461 | B2 | 5/2010 | Nagano et al. |
| 7,881,497 | B2 | 2/2011 | Ganguli et al. |
| 7,920,959 | B1 | 4/2011 | Williams |
| 8,094,943 | B2 | 1/2012 | Eaton et al. |
| 8,120,661 | B2 | 2/2012 | Rabinowitz et al. |
| 8,328,653 | B2 | 12/2012 | Lock |
| 8,379,926 | B2 | 2/2013 | Kanhere et al. |
| 8,611,593 | B2 | 12/2013 | Chen et al. |
| 8,718,327 | B2 | 5/2014 | Tong et al. |
| 8,947,529 | B2 | 2/2015 | Strine et al. |
| 9,171,390 | B2 | 10/2015 | Sumner et al. |
| 9,300,871 | B2 | 3/2016 | Zhou et al. |
| 9,418,320 | B2 | 8/2016 | Chang et al. |
| 9,542,626 | B2 | 1/2017 | Martinson et al. |
| 9,558,424 | B2 | 1/2017 | Ramalingam et al. |
| 9,665,804 | B2 | 5/2017 | Sarkis et al. |
| 9,716,832 | B2 | 7/2017 | Ryu et al. |
| 9,756,248 | B1 | 9/2017 | Wu et al. |
| 9,804,713 | B2 | 10/2017 | Guarneri et al. |
| 9,854,168 | B2 | 12/2017 | Wu et al. |
| 10,055,850 | B2 | 8/2018 | Piekniewski et al. |
| 10,535,127 | B1 | 1/2020 | Simonson et al. |
| 10,705,525 | B2 | 7/2020 | Smolyanskiy et al. |
| 10,769,799 | B2 | 9/2020 | Jales Costa et al. |
| 11,253,953 | B1* | 2/2022 | Jiang ................. B23K 26/0648 |
| 2002/0041339 | A1 | 4/2002 | Diepold |
| 2004/0076324 | A1 | 4/2004 | Burl et al. |
| 2008/0195316 | A1 | 8/2008 | Krishnaswamy |
| 2014/0218555 | A1 | 8/2014 | Kuo et al. |
| 2015/0003676 | A1 | 1/2015 | Kuchiki |
| 2015/0310274 | A1 | 10/2015 | Shreve et al. |
| 2015/0339589 | A1 | 11/2015 | Fisher |
| 2016/0125245 | A1 | 5/2016 | Saitwal et al. |
| 2016/0125621 | A1 | 5/2016 | Saitwal et al. |
| 2016/0173787 | A1 | 6/2016 | Yun |
| 2016/0236790 | A1 | 8/2016 | Knapp et al. |
| 2016/0292882 | A1 | 10/2016 | Comport et al. |
| 2017/0053554 | A1 | 2/2017 | Nalepka et al. |
| 2017/0053555 | A1 | 2/2017 | Angel et al. |
| 2017/0206717 | A1 | 7/2017 | Kühnapfel |
| 2017/0236252 | A1 | 8/2017 | Nguyen et al. |
| 2017/0358119 | A1 | 12/2017 | Forutanpour et al. |
| 2018/0024562 | A1 | 1/2018 | Bellaiche |
| 2018/0218214 | A1 | 8/2018 | Pestun et al. |
| 2019/0079535 | A1 | 3/2019 | Zhu et al. |
| 2019/0114491 | A1 | 4/2019 | Takaki |
| 2019/0286153 | A1 | 9/2019 | Rankawat et al. |
| 2020/0053286 | A1 | 2/2020 | Corona et al. |
| 2020/0065663 | A1 | 2/2020 | Singh et al. |
| 2020/0065978 | A1 | 2/2020 | Jales Costa et al. |
| 2020/0065980 | A1 | 2/2020 | Jales Costa et al. |
| 2020/0111358 | A1 | 4/2020 | Parchami et al. |
| 2020/0142421 | A1 | 5/2020 | Palanisamy et al. |
| 2020/0189573 | A1 | 6/2020 | King et al. |
| 2020/0380763 | A1 | 12/2020 | Abramov |
| 2020/0394917 | A1* | 12/2020 | Jales Costa ............. G06T 7/215 |
| 2020/0409385 | A1 | 12/2020 | Chakravarty et al. |

FOREIGN PATENT DOCUMENTS

| | | | | |
|---|---|---|---|---|
| CN | 102592112 | B | | 1/2014 |
| CN | 103077531 | B | | 11/2015 |
| CN | 106952474 | A | | 7/2017 |
| CN | 108230367 | A | | 6/2018 |
| CN | 110737834 | A | | 1/2020 |
| CN | 110858316 | A | * | 3/2020 ......... G06K 9/00335 |
| CN | 111986128 | A | * | 11/2020 .......... G05D 1/0221 |
| CN | 112146618 | A | * | 12/2020 .......... G05D 1/0253 |
| DE | 102019122402 | A1 | * | 2/2020 .......... G06K 9/00335 |
| DE | 102020113848 | A1 | * | 11/2020 .......... G05D 1/0221 |
| WO | 2016108847 | A1 | | 7/2016 |
| WO | 2017206999 | A1 | | 12/2017 |
| WO | 2018170393 | A9 | | 9/2018 |

OTHER PUBLICATIONS

Chen, et. al., "Object-Based Features for House Detection from RGB High-Resolution Images", MDPI Remote Sensing 2018, 10, 451, retrieved from Internet URL: www.mdpi.com/journal/remotesensing (24 pages).

Angelov, "Outside the Box: An Alternative Data Analytics Frame-Work", Journal of Automation, Mobile Robotics & Intelligent Systems, Vo. 8, No. 2, 2014 (7 pages).

David Nister, et al., "Visual Odometry for Ground Vehicle Applications", published in Journal of Field Robotics, Jan. 26, 2006 (35 pages).

The 20BN-jester Dataset V1, retrieved from Internet URL: https://20bn.com/datasets/jester, Mar. 27, 2019 (6 pages).

Kim, J., et al., "Foreground Objects Detection by U-Net with Multiple Difference Images," Applied Sciences, Feb. 18, 2021, (19 pages).

Non-Final Office Action for U.S. Appl. No. 16/456,192 as issued by the USPTO dated Jul. 26, 2022.

Notice of Allowance for U.S. Appl. No. 16/437,292 as issued by the USPTO dated Jul. 27, 2022.

* cited by examiner

500

ECCENTRICITY IMAGE FUSION

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
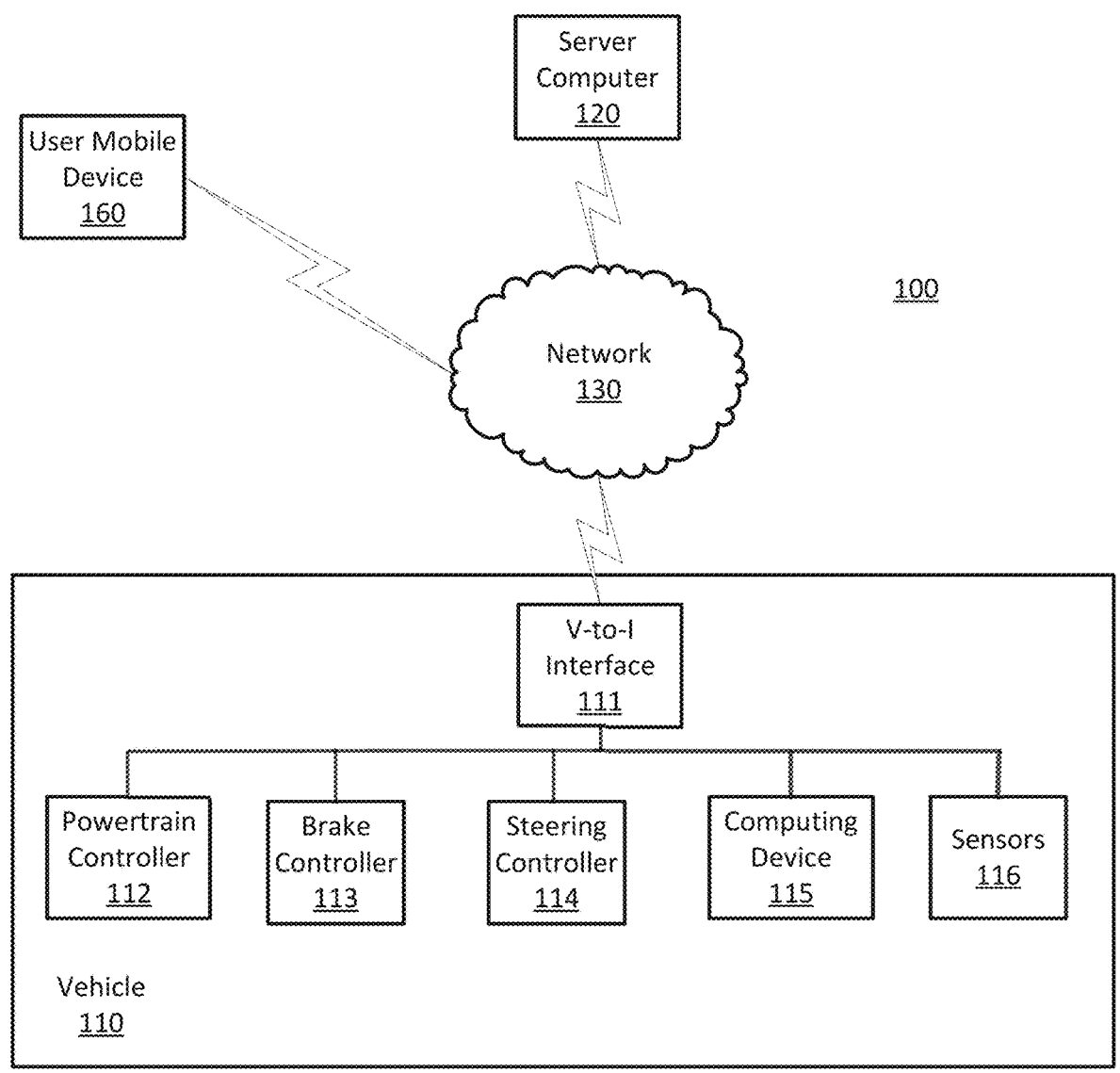
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of an information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding an external environment of a vehicle and to use the data to determine a vehicle path upon which to operate a vehicle in autonomous or semi-autonomous mode. A vehicle's path is a straight or curved line that describes successive locations (i.e., locations at different times) of a vehicle on a two-dimensional (2D) plane parallel to the surface of a roadway upon which the vehicle operates. A vehicle can operate on a roadway based on a vehicle's path by determining commands to direct the vehicle's powertrain, braking, and steering components to operate a vehicle so as to move along the path. The data regarding the external environment can include the location of an object in global coordinates. Example objects can include vehicles and pedestrians. The data can be received from a traffic infrastructure system and can be based on processing video camera data.

Techniques discussed herein can improve vehicle operation by improving a process to determine object location in video data. A process to determine object location in video data is improved by combining an eccentricity map with an RGB video image and processing the combined data with a neural network. Combining an eccentricity map with an RGB video image and processing the combined data with a neural network can reduce computation time and resources and improve object location accuracy compared to other machine vision-based techniques for locating objects in video data as are known. Improving computation time and accuracy for located objects can provide more accurate object locations more quickly to a vehicle and thereby improve vehicle operation.

Disclosed herein is a method, including inputting a red-green-blue (RGB) image and an eccentricity image to a neural network, wherein the eccentricity image is based on a per-pixel average and a per-pixel variance over a moving window of k video frames, combining, in the neural network, the RGB image and the eccentricity image and outputting, from the neural network, a located object based on combining the RGB image and the eccentricity image. The RGB image can be fused with the eccentricity image by addition, multiplication or concatenation. The neural network can be one or more of a you only look once (YOLO) neural network, a faster-region-based convolutional neural network (Faster-RCNN), and a single shot detector (SSD). The eccentricity image can be re-sized before the combining with the RGB image. The eccentricity image can be combined with the RGB image by one or more of per-pixel addition, per-pixel multiplication and per-pixel concatenation. The eccentricity image can be processed with a second neural network prior to concatenation with the RGB image.

The RGB image and the eccentricity image can be combined before processing with the neural network. The neural network can include a neural network body and a neural network head, and the eccentricity image is combined with RGB features following feature detection in the RGB image by the neural network body and prior to processing by the neural network head. A vehicle can receive the located object and the vehicle can be operated based on the located object. The located object can be measured in global coordinates based on intersecting a video camera field of view and a two-dimensional plane parallel to a roadway. The vehicle can be operated based on the location prediction includes controlling one or more of vehicle powertrain, brakes and steering. The global coordinates can be determined based on a location and a field of view of a video camera. The located object can be received at a server computer included in a traffic information system. The located object can be downloaded to the vehicle from the server computer.

Further disclosed is a computer readable medium, storing program instructions for executing some or all of the above method steps. Further disclosed is a computer programmed for executing some or all of the above method steps, including a computer apparatus, programmed to input a red-green-blue (RGB) image and an eccentricity image to a neural network, wherein the eccentricity image is based on a per-pixel average and a per-pixel variance over a moving window of k video frames, combining, in the neural network, the RGB image and the eccentricity image and outputting, from the neural network, a located object based on combining the RGB image and the eccentricity image. The RGB image can be fused with the eccentricity image by addition, multiplication or concatenation. The neural network can be one or more of a you only look once (YOLO) neural network, a faster-region-based convolutional neural network (Faster-RCNN), and a single shot detector (SSD). The eccentricity image can be re-sized before the combining with the RGB image. The eccentricity image can be combined with the RGB image by one or more of per-pixel addition, per-pixel multiplication and per-pixel concatenation. The eccentricity image can be processed with a second neural network prior to concatenation with the RGB image.

The computer can be further programmed to combine RGB image and the eccentricity image before processing with the neural network. The neural network can include a neural network body and a neural network head, and the eccentricity image is combined with RGB features following feature detection in the RGB image by the neural network body and prior to processing by the neural network head. A vehicle can receive the located object and the vehicle can be operated based on the located object. The located object can be measured in global coordinates based on intersecting a video camera field of view and a two-dimensional plane parallel to a roadway. The vehicle can be operated based on the location prediction includes controlling one or more of vehicle powertrain, brakes and steering. The global coordinates can be determined based on a location and a field of view of a video camera. The located object can be received at a server computer included in a traffic information system. The located object can be downloaded to the vehicle from the server computer.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive information regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
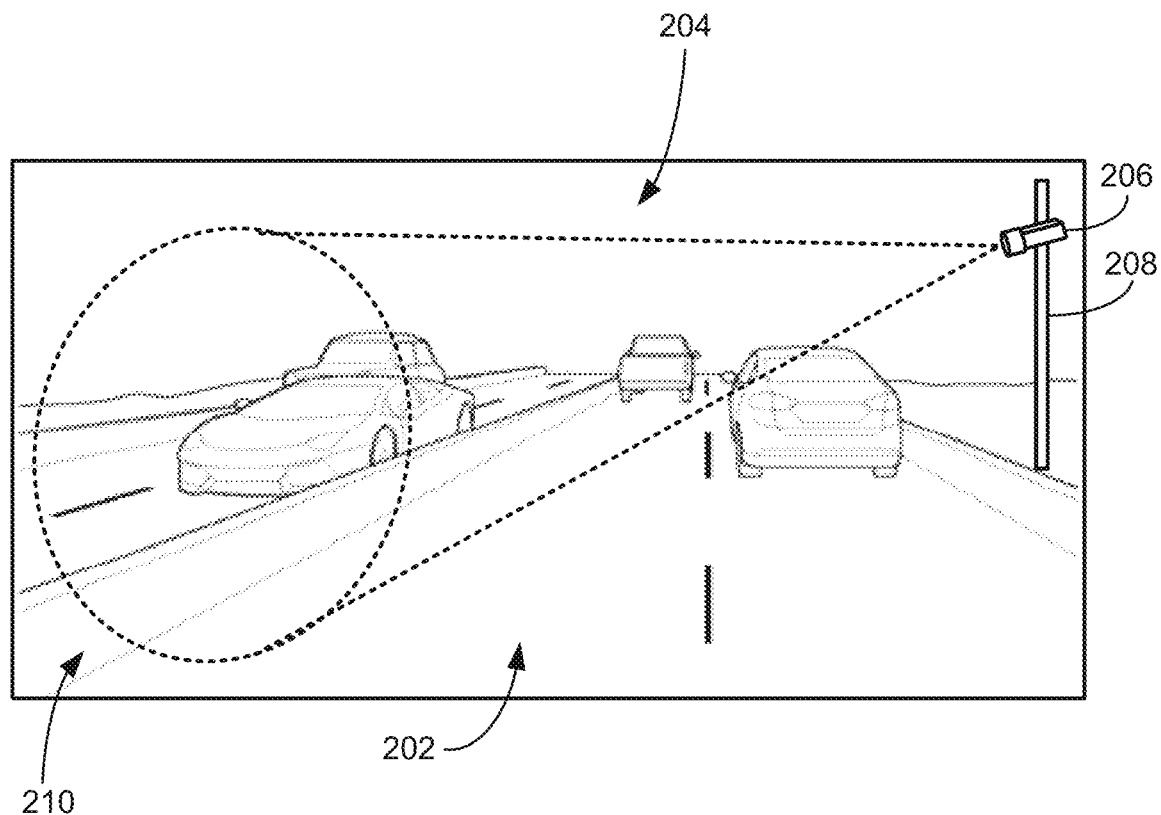
FIG. 2 is a diagram of an example traffic scene with a stationary camera.

FIG. 2 is a diagram of a traffic scene 200. Traffic scene 200 includes a roadway 202, upon which vehicles 204 operate. Traffic scene 200 also includes a stationary video camera 206. Stationary video camera 206 can be mounted on a pole 208, or other stationary structure, including a building, to afford stationary video camera 206 a field of view 210 that includes a portion of roadway 202 and typically including, from time to time, vehicles 204. Stationary video camera 206 can be attached to pole 208 to permit stationary video camera 206 to maintain a substantially unchanging field of view 210 with respect to roadway 202, i.e., the stationary camera 206 is stationary both with respect to its location and with respect to its orientation at the location.

Stationary video camera 206 can be calibrated to determine the three-dimensional (3D) location, in global coordinates, of the field of view 210. Global coordinates are positional values based on a global coordinate system such as used by a GPS, such as latitude, longitude and altitude, for example. By determining the 3D location of field of view 210 in global coordinates, the 3D location in global coordinates of a region in a stationary video camera data can be determined, wherein the region corresponds to an object, for example.

A stationary video camera 206 can be calibrated by acquiring a frame of video data that includes an object with measured real-world features at a measured real world location. The size of a feature can be determined in the video data and compared to the measured size of the feature in the real world to form a feature size ratio. The feature size ratio can be combined with information regarding the location of the video camera in global coordinates and the magnification of the lens to determine projective geometry coefficients for transforming distances and locations expressed as pixel coordinates into distances and locations in global coordinates.

A projective transformation is used for transforming locations in pixel coordinates into global coordinates based on the fact that the location in pixel coordinates is based on projecting real world locations onto a sensor plane with a lens. By determining a six-dimensional location and orientation of the sensor plane and the magnification of the lens and combining this with ground truth data corresponding to measured global coordinates of real world locations and data corresponding to the location of a two-dimensional plane parallel to a roadway, coefficients can be determined which transform pixel coordinates into global coordinates by projective geometry. Six-dimensional location and orientation refers to positional coordinates x, y, and z and rotational coordinates roll, pitch, and yaw. Projective geometry refers to the mathematical equations used to transform locations in one frame of reference, for example an image plane, into locations in a second frame of reference, for example the real world. Coefficients can be determined based on information regarding measured real world locations, a field of view and a magnification of a lens included in a video camera to transform pixel coordinates of objects detected in video data into real world locations in measured in global coordinates.

Stationary video camera 206 can be included in a traffic infrastructure system 100. A traffic infrastructure system 100 can include server computers 120 configured to acquire stationary video camera data and process it to track objects and locate the tracked objects in global coordinates. Traffic infrastructure system 100 can also communicate with a vehicle 110 based on the location of the vehicle 110. For example, a traffic infrastructure system 100 can communicate with a vehicle 110 based on its proximity to a stationary video camera 206. The traffic infrastructure system 100 can determine data regarding a tracked object that can be out of the field of view of sensors included in a vehicle 110 but might be viewable by the vehicle 110 in the near future, for example. Traffic infrastructure system 100 can acquire video data from video cameras mounted on platforms other than poles 208. Video cameras can be mounted on vehicles and drones, for example. A traffic infrastructure system 100 can acquire traffic data, including video data, from a plurality of stationary cameras, drones, vehicles, and cloud-based traffic data sources to form a map including roadways and traffic in a portion of the real world. The map data can be downloaded to vehicles 110 based on their real world locations, for example.

Figure 3:
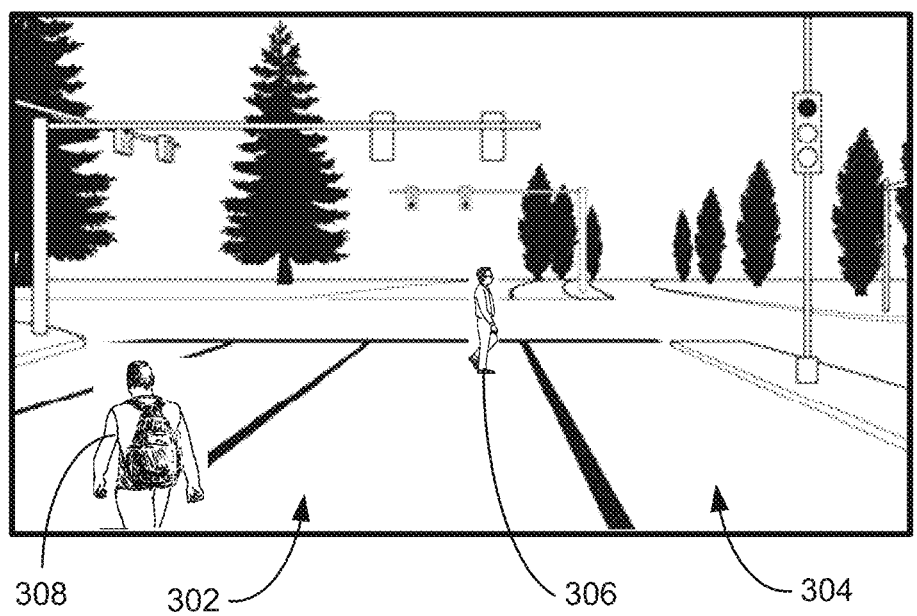
FIG. 3 is a diagram of an example red, green, and blue (RGB) video frame.

FIG. 3 is a diagram of an example red, green, blue (RGB) video frame or image 300 rendered in black and white to comply with Patent Office regulations. Video frame 300 is an example frame of video stream data that includes a traffic scene 302. Traffic scene 302 includes a roadway 304 and objects including two pedestrians 306, 308. A video stream data can be processed to extract data regarding the location and classification of objects in RGB video data 300 in real time. Real time in this example is defined as processing RGB video data 300 to determine object data in a small number of video frame times, for example ten, where a video frame time can be about 0.015 seconds. A computing device in communication with a stationary video camera 206 can acquire RGB video data 300 corresponding to traffic scene 302 and determine locations of pedestrians 306, 308, for example. Techniques described herein use the fact that traffic scene 302 is dynamic and processing sequences of video frames together provides features that can be used for object detection. Eccentricity processing of video data 300 combined with neural network processing can detect, classify, and locate objects in video data 300 in real time. Techniques described herein can use as input RGB video, grayscale video, near infrared video, and far infrared video data to determine objects in a traffic scene.

Figure 4:
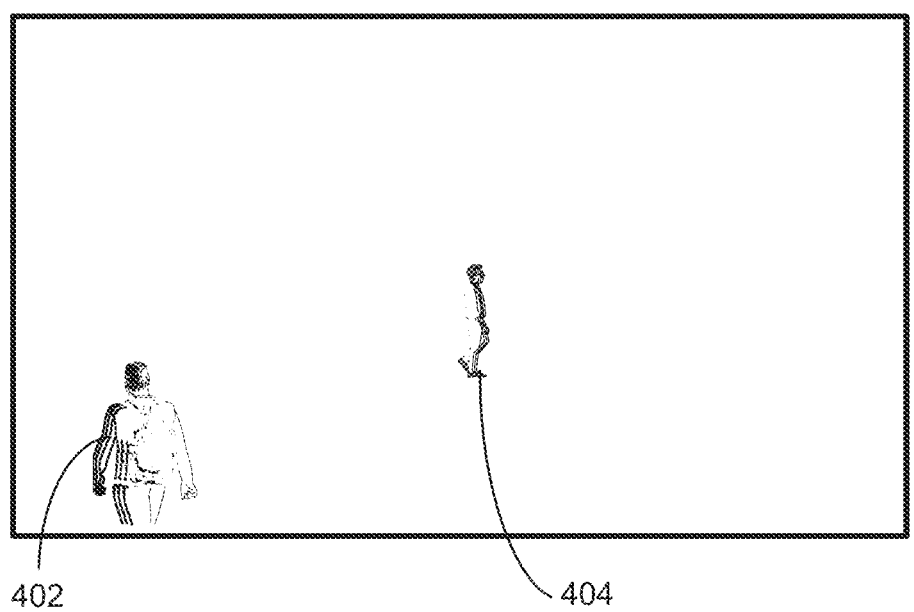
FIG. 4 is a diagram of an example eccentricity map.

FIG. 4 is an example eccentricity image or map 400 rendered in black and white to comply with Patent Office regulations. Eccentricity map 400 is output by an eccentricity process described by equations (1)-(5) in response to input video data 300. Eccentricity is a measure of the rate of change in value of pixels in a video stream data, where a video stream data includes a plurality of frames of video data acquired at equal time intervals. Eccentricity processing calculates a per-pixel normalized eccentricity $\varepsilon_k$ for a video frame (time) k of video stream data based on determining per-pixel rolling mean and rolling variance for video stream data and comparing a pixel's current value to the mean value for that pixel including variance. Rolling mean and rolling variance refers to a mean and variance that changes with each successive frame of video data processed. Eccentricity $\varepsilon_k$ can determine contiguous regions of pixels corresponding to moving objects in a video stream data by determining foreground and background pixels based on a pixel's eccentricity $\varepsilon_k$ value. Eccentricity $\varepsilon_k$ tends to be zero or small (near zero) for pixels that do not change values over time, from video frame to video frame, i.e. background pixels. Eccentricity $\varepsilon_k$ tends to be non-zero for pixels that change values over time, i.e. foreground pixels. Foreground pixels correspond to moving objects like vehicle and pedestrians. At time k, a per-pixel mean $\eta_k$ for pixel value samples up to time k can be calculated by equation (1):

$$\mu_k = (1-\alpha)\mu_{k-1} + \alpha x_k \qquad (1)$$

where $x_k$ is the pixel value at time k and $\alpha$ is an exponential decay factor in the range (0,1) and corresponds to a "forgetting factor" which decreases the effect of video data on eccentricity $\varepsilon_k$ as distance from time k increases, having the effect of a finite window of video frames that updates each frame. The constant $\alpha$ can be determined by user input. Per-pixel variance $\sigma_k^2$ for samples up to time k can be calculated by equations (2) and (3) using a temporary variable $d_k^2$:

$$d_k^2 = (x_k - \mu_k)^T(x_k - \mu_k) = \|x_k - \mu_k\|^2 \qquad (2)$$

$$\sigma_k^2 = (1-\alpha)\sigma_{k-1}^2 + \frac{\alpha}{(1-\alpha)}d_k^2 \qquad (3)$$

Per-pixel mean $\mu_k$ and variance $\sigma_k^2$ can be combined to calculate eccentricity $\varepsilon_k$:

$$\varepsilon_k = \alpha\left(1 + \frac{\|x_k - u_k\|^2}{\max[\gamma, \sigma_k^2]}\right) \qquad (4)$$

where $\max[\gamma, \sigma_k^2]$ is a function that selects the maximum between variance $\sigma_k^2$ and a constant $\gamma$, which can be determined by user input to avoid numerical instability when $\sigma_k^2$ is near zero. Normalized eccentricity $\varepsilon_{k_{norm}}$ can be calculated by equation (5), which normalizes eccentricity $\varepsilon_{k_{norm}}$ to assume values in the range (0,1):

$$\varepsilon_{k_{norm}} = \frac{\alpha}{(1-\alpha)}\left(1 + \frac{\|x_k - \mu_k\|^2}{\max[\gamma, \sigma_k^2]}\right) \qquad (5)$$

Figure 5:
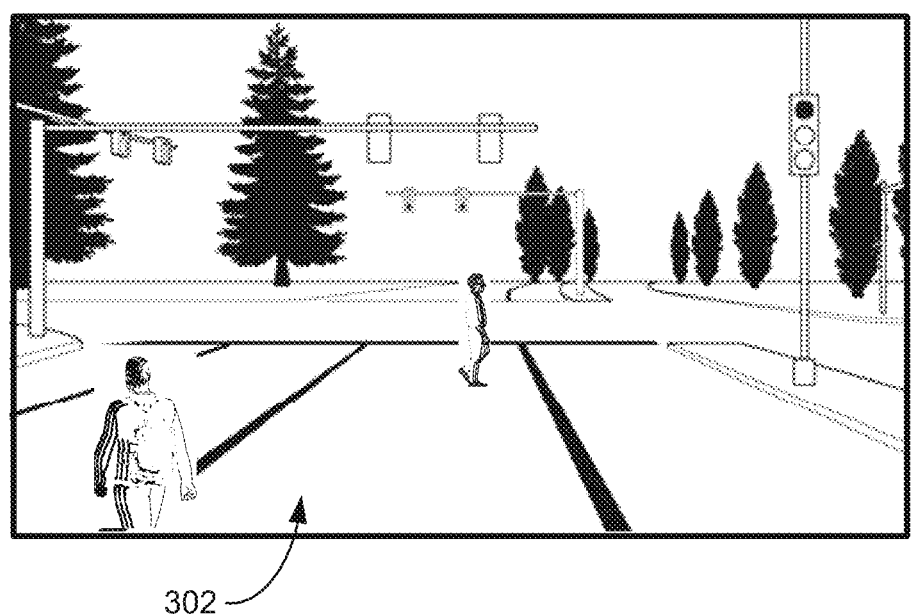
FIG. 5 is a diagram of an example eccentricity map fused with an RGB video frame.

FIG. 5 is a diagram of an example fused eccentricity and video image 500 rendered in black and white to comply with Patent Office regulations. Eccentricity map 400 can be combined with an input RGB video data 300 frame to form fused eccentricity and video image 500. Eccentricity map 400 can be combined with input RGB video frame 300 by performing pixel-by-pixel fusion of eccentricity pixels with RGB pixels by addition, by multiplication, or by concatenating an additional eccentricity channel to the RGB channels. In some examples the RGB pixels can be transformed into grayscale pixels before combining with the eccentricity pixels.

Fused eccentricity and video image 500 can be processed with a neural network to detect objects, where detecting an object includes identifying an object, meaning that the neural network has determined that a contiguous region of pixels in an output image correspond to an object in an input video frame. Detecting an object also can include classifying an object, meaning that the neural network determines a probability that a contiguous region of pixels in an output image belongs to a class of objects, where the class of objects can be determined by the range of objects included in neural network training datasets, for example. Locating an object can include surrounded a contiguous region of pixels in an output image with a minimally enclosing rectangle and reporting the size and location of the rectangle. Techniques discussed herein improve object identification, classification, and location by fusing eccentricity maps with an RGB video frame to encode time varying motion of objects into a grayscale image to permit neural networks to determine object features more quickly and accurately than with RGB video frame data alone.

The eccentricity map data may also be used to predict the motion of obstacles relative to a traffic scene. It can be used to differentiate between a stationary pedestrian from a pedestrian moving in the traffic scene. A determined eccentricity pixel value can be constant for a stationary object. In examples that include a moving object, the eccentricity pixel value can continue to change from eccentricity map to eccentricity map. The relationship between the eccentricity pixel value variation over successive frames can be analyzed and used for motion tracking, and path prediction of objects in combination with an RGB image.

Eccentricity map/RGB video fusion data can be processed with object detection neural networks including faster-recurrent convolutional neural networks (Faster-RCNN) ("Faster R-CNN: Towards Real-Time Object Detection with Region Proposal Networks", Ren, S., et. al., arXiv.org>cs>arXiv:1506.01497, Jun. 4, 2015), You only look once (YOLO) networks (pjreddie.com/darknet/yolo/, Mar. 22, 2019), and Single shot detector (SSD) networks ("SSD: Single Shot MultiBox Detector", Liu, W., Et. Al., arXiv.org>cs>arXiv:1512.02325, Dec. 8, 2015) to detect objects. Eccentricity maps 400 can be combined with an RGB video frame 300 at different points in the object detection process. FIGS. 7-10, discussed below, illustrate different neural network architectures that combine eccentricity maps 400 at different points in the object detection process.

Figure 6:
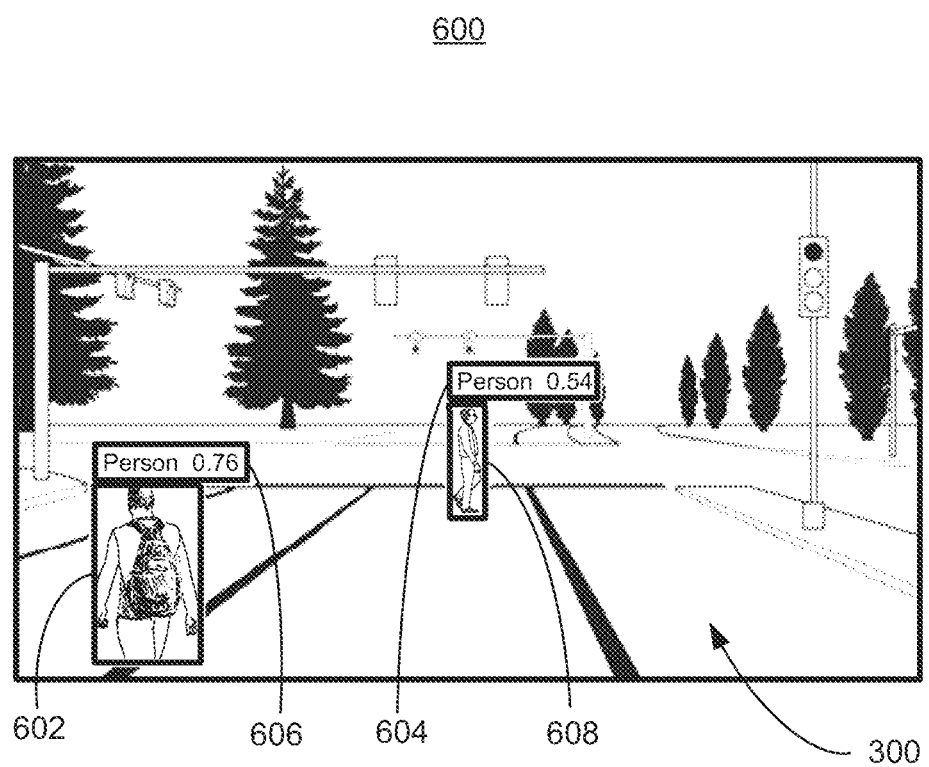
FIG. 6 is a diagram of an example RGB video frame with identified, classified, and located objects.

FIG. 6 is a diagram of an example output video frame 600 rendered in black and white to comply with Patent Office regulations. Output vide frame 600 includes an RGB video frame 300 overlaid with object rectangles 602, 604 and classification labels 606, 608. Object rectangles 602, 604 and classification labels 606, 608 can be based on object identification, classification, and location data output by one or more neural networks described in relation to FIGS. 7-10 below in response to input video stream data. Object rectangles 602, 604 can be minimal bounding rectangles determined based object location and object size data output by the neural networks. Classification labels 606, 608 (e.g., "Person") can be determined based on object classification determined by the neural networks and can include a probability expressed as a number in the range (0, 1) corresponding to a probability that the classification is correct.

Object identity, class, and location as illustrated in FIG. 6 can be transformed into global coordinates as discussed above in relation to FIG. 2 and communicated to a traffic infrastructure system 100. A traffic infrastructure system 100 can store the object data at a server computer 120 and transmit it to a vehicle 110 based on a location of the vehicle 110 in global coordinates. For example, a server computer 120 in a traffic infrastructure system 100 can determine, based on data received from vehicles in a determined geographic region, that a vehicle 110 is approaching the intersection illustrated in traffic scene 302. Server computer 120 can download object data in global coordinates to a vehicle 110 to permit a computing device 115 in the vehicle 110 to include the downloaded object data when determining a path for vehicle 110 travel. The objects corresponding to the downloaded object data can be out of view of sensors 116 included in vehicle 110 at the time they are downloaded, thereby improving vehicle 110 path planning, for example.

Figure 7:
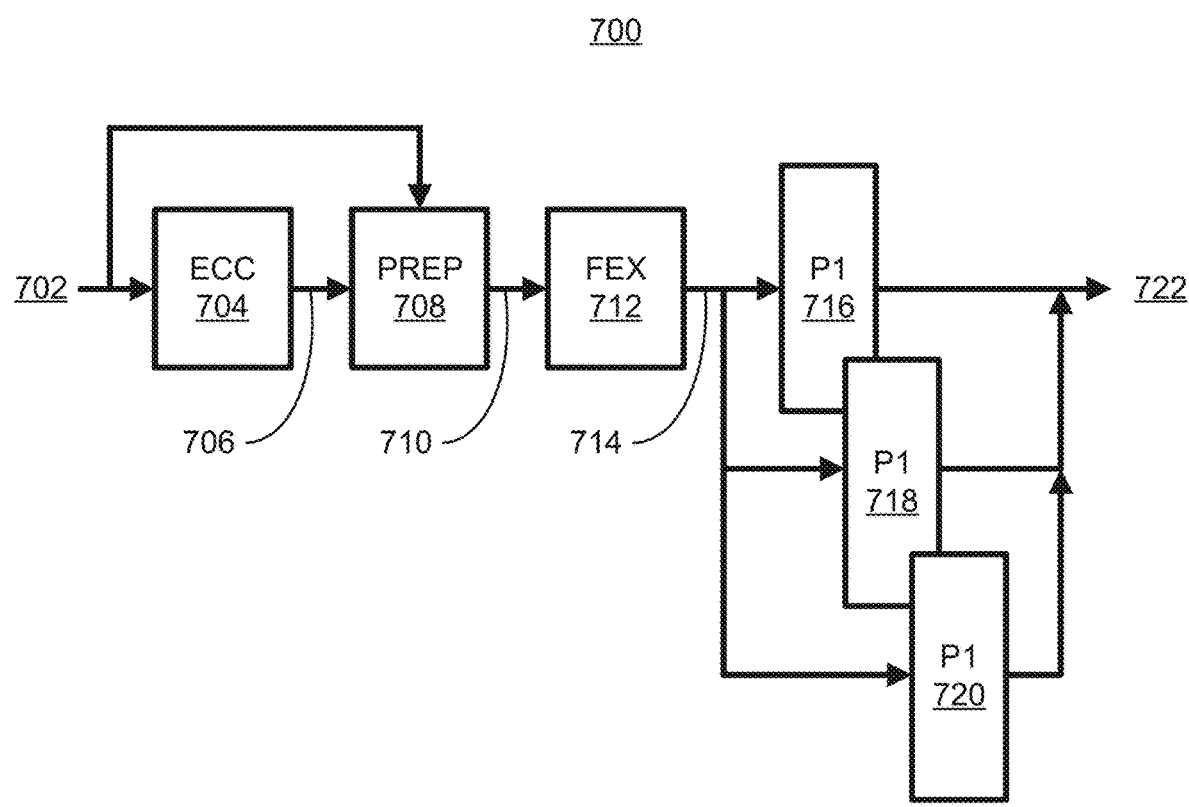
FIG. 7 is a diagram of an example neural network system to detect objects in fused eccentricity maps and RGB video frames.

FIG. 7 is a diagram of an example neural network system 700 that inputs video stream data 702 and outputs object features 722 including identity, classification, and location. In this example, an eccentricity map 400 is generated and fused with a frame of video data 300 before passing the data to a neural network for processing. Neural network system 700 is based on a YOLO V3 architecture with the addition of eccentricity processor (ECC) 704 and preprocessor (PREP) 708. Eccentricity processor 704 inputs video stream data 702 and outputs 706 eccentricity maps 400 according to equations (1)-(5), above. Preprocessor 708 inputs an eccentricity map 400 and a frame of video stream data 702 and outputs a fused eccentricity and video image 500 as discussed above in relation to FIG. 5.

Output 710 fused eccentricity and video image 500 is passed to neural network feature extraction (FEX) layers 712. Feature extraction layers 712 are also referred to as a neural network "body". Feature extraction layers 712 are convolutional layers that extract object features 714 from image data. In this example, extracted object features 714 are passed to three separate fully connected layers (P1, P2, P3) 716, 718, 720 for processing at three separate spatial scales. Fully connected layers 716, 718, 720 can be referred to as a neural network "head". Output from the three fully connected layers 716, 718, 720 is combined in output 722. During training, output 722 is backpropagated to be compared to ground truth data to form a loss function. Ground truth is object detection data obtained from a source independent from the neural network. For example objects can be measured in the real world and converted from global coordinates to pixel coordinates, or measured directly in video image data to determine object identity, classification, and location data. During training output 722 object data is compared to ground truth to determine and save parameters or weights corresponding to correct responses and thereby train neural network system 700 to detect objects. Neural network system 700 is an example of early fusion of eccentricity and video image data.

Figure 8:
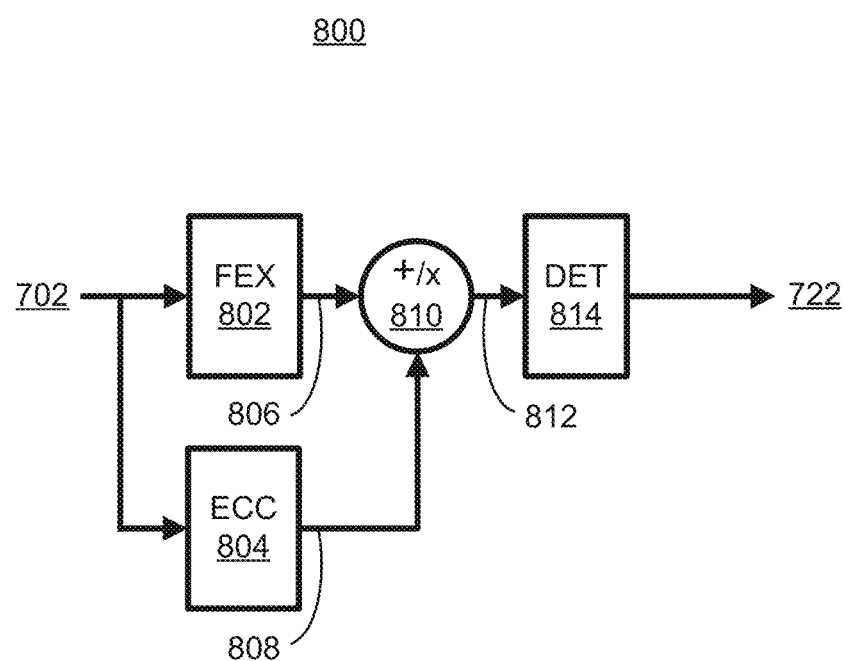
FIG. 8 is a diagram of another example neural network system to detect objects in fused eccentricity maps and RGB video frames.

FIG. 8 is a diagram of an example a neural network system 800 to determine object data 722 based on an input video stream data 702. Neural network system 800 is an example of late fusion of eccentricity and video image data. In neural network system 800, a frame of video stream data 702 is input to a feature extraction processor (FEX) 802 in parallel with eccentricity processor (ECC) 804. Feature extraction processor 802 is a neural network "body" and can be part of a Faster-RCNN, a YOLO V3 network or a SSD network, for example. Feature extraction processor 802 is a convolutional/pooling processor that interleaves convolutional layers with pooling layers that reduce spatial resolution of output object features 806. Eccentricity processor 804 outputs eccentricity map data 808 at re-sized spatial resolution to match the spatial resolution of object features 806. Combiner (+/x) 810 performs per-pixel addition or per-pixel multiplication depending upon user input. Fused eccentricity and image data 812 are input to full connected object detector layers 814 (neural network "head"), where the fused eccentricity and object feature data is processed to produce object data 722 including object identity, classification, and location.

Figure 9:
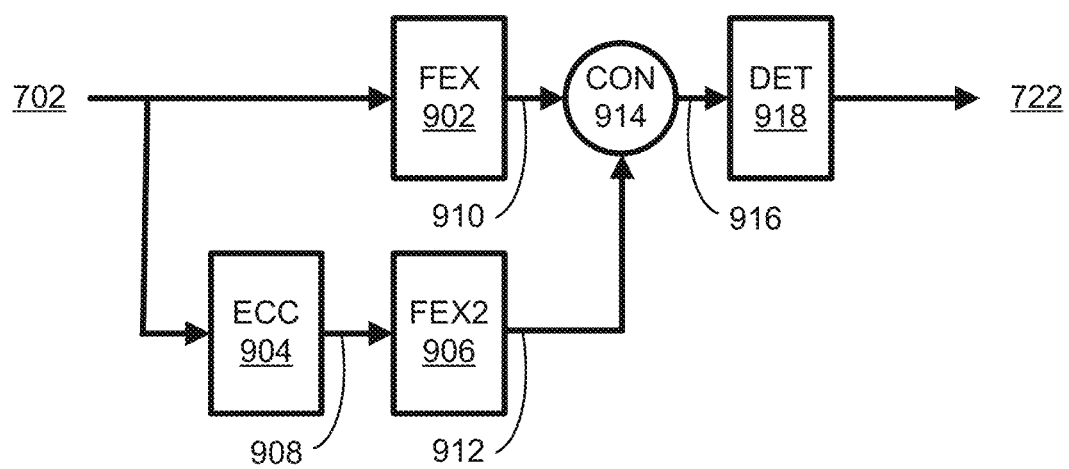
FIG. 9 is a diagram of yet another example neural network system to detect objects in fused eccentricity maps and RGB video.

FIG. 9 is a diagram of an example neural network system 900 for processing input video stream data 702 to detect object data 722. Neural network system 900 illustrates another example of late fusion of eccentricity data and video image data. Neural network system 900, like neural network systems 700 and 800, can be constructed using Faster-RCNN, YOLO networks, or SSD networks, for example. In neural network system 900, input video stream data 702 is input in parallel to feature extraction (FEX) 902 layers and eccentricity processor (ECC) 904. Eccentricity processor output an eccentricity map 908 that is input to a second feature extraction network (FEX2) 906. Second feature extraction network 906 is a series of convolutional/max pooling layers that extract feature information from the eccentricity map 908 and forms eccentricity features that are at the same spatial resolution as object feature 910 output from feature extraction 902 layers. Object features 910 and eccentricity features 912 are combined by concatenator (CON) 914 by per-pixel concatenation and output as fused eccentricity and image data 916 to feature detector (DET) 918. Feature detector is a series of fully-connected neural network layers or "head" that output object data 722 including object identity, class, and location. Eccentricity map 908 can also be concatenated with object features 910 without applying a convolutional network like second feature extraction 906. This approach can reduce the effectiveness of the eccentricity map 908 because one map would be blended into multiple object feature channels, however it would be faster and can include less processing overhead.

Figure 10:
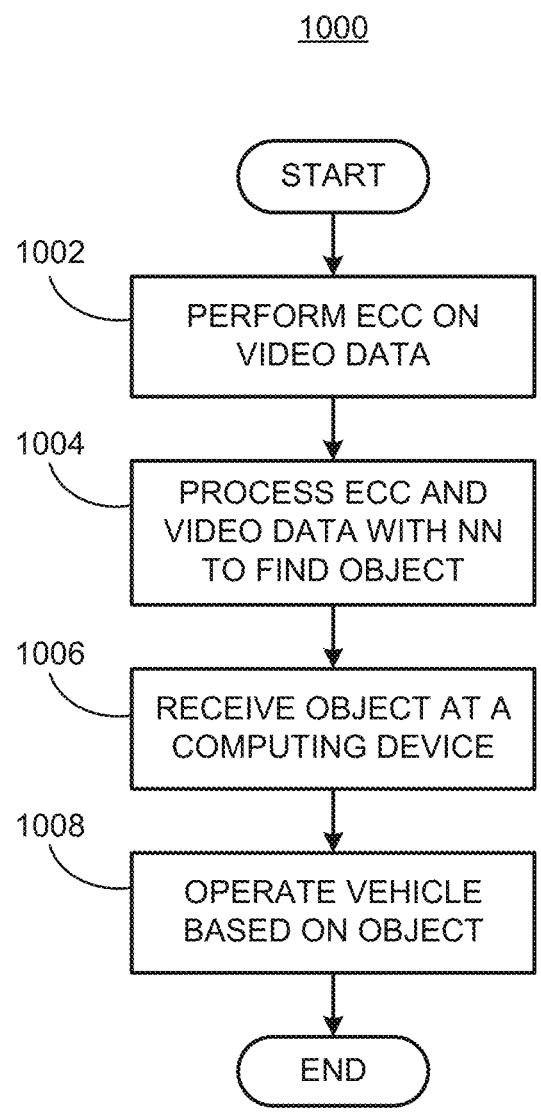
FIG. 10 is a flowchart diagram of a process to determine identify, classify, and locate an object in video stream data.

FIG. 10 is a diagram of a flowchart, described in relation to FIGS. 1-9, of a process 1000 for determining an object data and receiving the object data at a computing device. Process 1000 can be implemented by a computing device, taking as input information from sensors, and executing commands, for example. Process 1000 includes multiple blocks taken in the disclosed order. Process 1000 could alternatively or additionally include fewer blocks or can include the blocks taken in different orders.

Process 1000 begins at block 1002, where process 1000 processes input video stream data 702 to form an eccentricity map 400 as discussed above in relation to FIG. 4. The input data video stream data 702 can be an RGB video stream data acquired by a stationary video camera or a video camera mounted on a vehicle or a drone, for example.

At block 1004 process 1000 processes the eccentricity map 400 and a frame of input video stream data 702 with a neural network as described above in relation to FIGS. 7-10 to output object data 722 including object identity, class and location. Process 1000 can transform the object location data to global coordinates as discussed above in relation to FIG. 2.

At block 1006 process 1000 outputs the object data 722 to a computing device. The computing device can be a server computer 120 in a traffic infrastructure system 100. The server computer 120 can receive the object data 722 and store it for later combining with object data from other sources and downloading to vehicles.

At block 1008 a vehicle 110 receives the object data downloaded from server computer 120. As discussed above, vehicle 110 can determine a vehicle path taking into account a received location of an object. For example, a computing device 115 in a vehicle 110 can determine a vehicle path that avoids collision or near-collision with an object. A computing device 115 in a vehicle 110 can command controllers 112, 113, 114 to operate vehicle powertrain, brakes and steering to travel along the vehicle path and thereby avoid collision or near-collision with the object. Following block 1008 process 1000 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A system, comprising a processor; and
 a memory, the memory including instructions to be executed by the processor to:
  input a red-green-blue (RGB) image and an eccentricity image to a neural network, wherein the eccentricity image is based on a per-pixel rolling average and a per-pixel rolling variance over a finite window of video frames;
  combine, in the neural network, the RGB image and the eccentricity image; and output, from the neural network, a located object based on combining the RGB image and the eccentricity image.

2. The system of claim 1, wherein the RGB image is fused with the eccentricity image by addition, multiplication or concatenation.

3. The system of claim 1, wherein the neural network is one or more of a you only look once (YOLO) neural network, a faster-region-based convolutional neural network (Faster-RCNN), and a single shot detector (SSD).

4. The system of claim 1, wherein the instructions further include instructions to re-size the eccentricity image before combining with the RGB image.

5. The system of claim 1, wherein the instructions further include instructions to combine the eccentricity image with the RGB image by one or more of per-pixel addition, per-pixel multiplication and per-pixel concatenation.

6. The system of claim 5, wherein the instructions further include instructions to process the eccentricity image with a second neural network prior to concatenation with the RGB image.

7. The system of claim 1, wherein the instructions further include instructions to combine the RGB image and the eccentricity image before processing with the neural network.

8. The system of claim 1, wherein the neural network includes a neural network body and a neural network head, and the instructions further include instructions to combine the eccentricity image with RGB features following feature detection in the RGB image by the neural network body and prior to processing by the neural network head.

9. The system of claim 1, wherein the instructions further include instructions to receive, at a vehicle, the located object and operating the vehicle based on the located object.

10. The system of claim 9, wherein the located object is measured in global coordinates based on intersecting a video camera field of view and a two-dimensional plane parallel to a roadway.

11. A method, comprising:
inputting a red-green-blue (RGB) image and an eccentricity image to a neural network, wherein the eccentricity image is based on a per-pixel rolling average and a per-pixel rolling variance over a moving window of k video frames;
combining, in the neural network, the RGB image and the eccentricity image; and
outputting, from the neural network, a located object based on combining the RGB image and the eccentricity image.

12. The method of claim 11, wherein the RGB image is converted to grayscale before combining with the eccentricity image.

13. The method of claim 11, wherein the neural network is one or more of a you only look once (YOLO) neural network, a faster-region-based convolutional neural network (Faster-RCNN), and a single shot detector (SSD).

14. The method of claim 11, wherein the eccentricity image is re-sized before the combining with the RGB image.

15. The method of claim 11, wherein the eccentricity image is combined with the RGB image by one or more of per-pixel addition, per-pixel multiplication and per-pixel concatenation.

16. The method of claim 15, wherein the eccentricity image processed with a second neural network prior to concatenation with the RGB image.

17. The method of claim 11, further comprising combining the RGB image and the eccentricity image before processing with the neural network.

18. The method of claim 11, wherein the neural network includes a neural network body and a neural network head, and the eccentricity image is combined with RGB features following feature detection in the RGB image by the neural network body and prior to processing by the neural network head.

19. The method of claim 11, further comprising receiving, at a vehicle, the located object and operating the vehicle based on the located object.

20. The method of claim 19, wherein the located object is measured in global coordinates based on intersecting a video camera field of view and a two-dimensional plane parallel to a roadway.

* * * * *